(12) United States Patent
Sambonsugi (10) Patent No.: US 8,174,584 B2
(45) Date of Patent: May 8, 2012

(54) IMAGE SHOOTING APPARATUS AND CONTROL METHOD AND PROGRAM THEREOF

(75) Inventor: Hideaki Sambonsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 12/431,344

(22) Filed: Apr. 28, 2009

(65) Prior Publication Data

US 2009/0273684 A1 Nov. 5, 2009

(30) Foreign Application Priority Data

May 2, 2008 (JP) .................................. 2008-120765

(51) Int. Cl.
 *H04N 5/225* (2006.01)
 *H04N 5/76* (2006.01)
 *H04N 7/18* (2006.01)

(52) U.S. Cl. ............. 348/220.1; 348/231.99; 348/231.9; 348/155

(58) Field of Classification Search ............... 348/220.1, 348/231.99, 231.2, 152–155, 143, 169, 231.1–231.6, 348/231.9
 See application file for complete search history.

(56) References Cited

U.S. PATENT DOCUMENTS

| | | | |
|---|---|---|---|
| 6,678,393 B1 * | 1/2004 | Dunton et al. | 382/103 |
| 6,803,945 B1 * | 10/2004 | Needham | 348/155 |
| 7,110,025 B1 * | 9/2006 | Loui et al. | 348/220.1 |
| 7,450,157 B2 * | 11/2008 | Obrador et al. | 348/220.1 |
| 7,676,145 B2 * | 3/2010 | Kuberka et al. | 396/49 |
| 7,705,904 B2 * | 4/2010 | Miyata | 348/333.05 |
| 2004/0101051 A1 * | 5/2004 | Ishii | 375/240.13 |
| 2005/0190274 A1 * | 9/2005 | Yoshikawa et al. | 348/231.99 |
| 2009/0135265 A1 * | 5/2009 | Kawamura et al. | 348/220.1 |
| 2009/0290035 A1 * | 11/2009 | Hosoda | 348/220.1 |

FOREIGN PATENT DOCUMENTS

JP 2004-140586 A 5/2004

* cited by examiner

*Primary Examiner* — Nhan T Tran
(74) *Attorney, Agent, or Firm* — Cowan, Liebowitz & Latman, P.C.

(57) ABSTRACT

An apparatus which concurrently shoots a movie and a still image, comprises an image sensing unit which generates movie data and still image data; a storage unit which stores the generated still image data in a temporary memory area at predetermined time intervals; a detection unit which detects at least one of feature information, audio information and operation information; an analyzing unit which analyzes the detected information; a control unit which outputs, based on an analysis result, an instruction used as a trigger for selecting still image data among the still image data stored in the temporary memory area; an image processing unit which performs image processing on the selected still image data selected in accordance with the instruction used as the trigger; and a recording unit which records the processed still image data.

6 Claims, 8 Drawing Sheets

IMAGE SHOOTING APPARATUS AND CONTROL METHOD AND PROGRAM THEREOF

BACKGROUND OF THE INVENTION

1. Field of the Invention

The present invention relates to image shooting technique with which a movie and a still image can be concurrently shot.

2. Description of the Related Art

Conventionally, an image shooting apparatus such as a surveillance camera capable of concurrently shooting a movie and a still image has been proposed. With such an image shooting apparatus, while recording a movie that was shot in a recording medium for a movie, by issuing a still image shooting instruction to a camera, a still image can also be recorded in a recording medium for a still image. However, a still image recorded at the point in time when the still image shooting instruction was detected may have been shot later than the moment when recording was originally intended to be performed.

Consequently, some surveillance cameras and the like are configured to concurrently shoot a movie and a still image at all times and, if a still image shooting instruction is detected, all the still images that were shot before the still image shooting instruction was detected can be recorded, thereby enabling obtaining a desired still image (for example, Japanese Patent Laid-Open No. 2004-140586).

However, according to Japanese Patent Laid-Open No. 2004-140586 described above, a desired still image needs to be selected among a great number of still images that were shot during a certain period of time before the still image shooting instruction was detected, which is troublesome.

SUMMARY OF THE INVENTION

The present invention was achieved in view of the above problems and realizes technique with which, in an image shooting apparatus capable of concurrently shooting a movie and a still image, appropriate still image data that was obtained before a still image shooting instruction was detected can be recorded without performing a troublesome operation.

In order to address the above problems, the present invention provides an image shooting apparatus which concurrently shoots a movie and a still image, comprising: an image sensing unit configured to generate movie data and still image data by performing photo-electric conversion on an object image; a storage unit configured to store the still image data generated by the image-sensing unit in a temporary memory area at predetermined time intervals; a detection unit configured to detect at least one of feature information regarding an object in the movie data generated by the image-sensing unit, audio information which was concurrently recorded with the movie data, and operation information regarding a user; an analyzing unit configured to analyze the information detected by the detection unit; a control unit configured to output, based on an analysis result by the detection unit, an instruction used as a trigger for selecting still image data among the still image data stored in the temporary memory area; an image processing unit configured to perform image processing on the selected still image data selected in accordance with the instruction used as the trigger; and a recording unit configured to record the still image data processed by the image processing unit.

The present invention also provides a method for controlling an image shooting apparatus which concurrently shoots a movie and a still image, the method comprising: an image sensing step of generating movie data and still image data by an image-sensing unit configured to perform photo-electric conversion on an object image; a storing step of storing the still image data generated in the image-sensing step in a temporary memory area at predetermined time intervals; a detecting step of detecting at least one of feature information regarding an object in the movie data generated in the image-sensing step, audio information which was recorded concurrently with the movie data, or operation information regarding a user; an analyzing step of analyzing the information detected in the detecting step; a controlling step of outputting, based on an analysis result in the detecting step, an instruction used as a trigger for selecting still image data among the still image data stored in the temporary memory area; an image processing step of performing image processing on the selected still image data selected in accordance with the instruction used as the trigger; and a recording step of recording, in a recording medium, the still image data processed in the image processing step.

According to the above aspects of the present invention, in an image shooting apparatus capable of concurrently shooting a movie and a still image, an appropriate still image that was shot before the point in time when a still image shooting instruction was detected can be recorded without performing the troublesome operation of selecting a desired still image among a great number of still images.

Further features of the present invention will become apparent from the following description of exemplary embodiments with reference to the attached drawings.

DESCRIPTION OF THE EMBODIMENTS

Hereinafter, embodiments of the present invention shall be described in detail with reference to the attached drawings.

It should be noted that the embodiments described below are merely example for realizing the present invention, and therefore the embodiments may be modified as appropriate depending on the configuration of the apparatus and the various conditions to which the present invention is applied; the present invention is not intended to be limited to the embodiments described below.

First Embodiment

Figure 1:
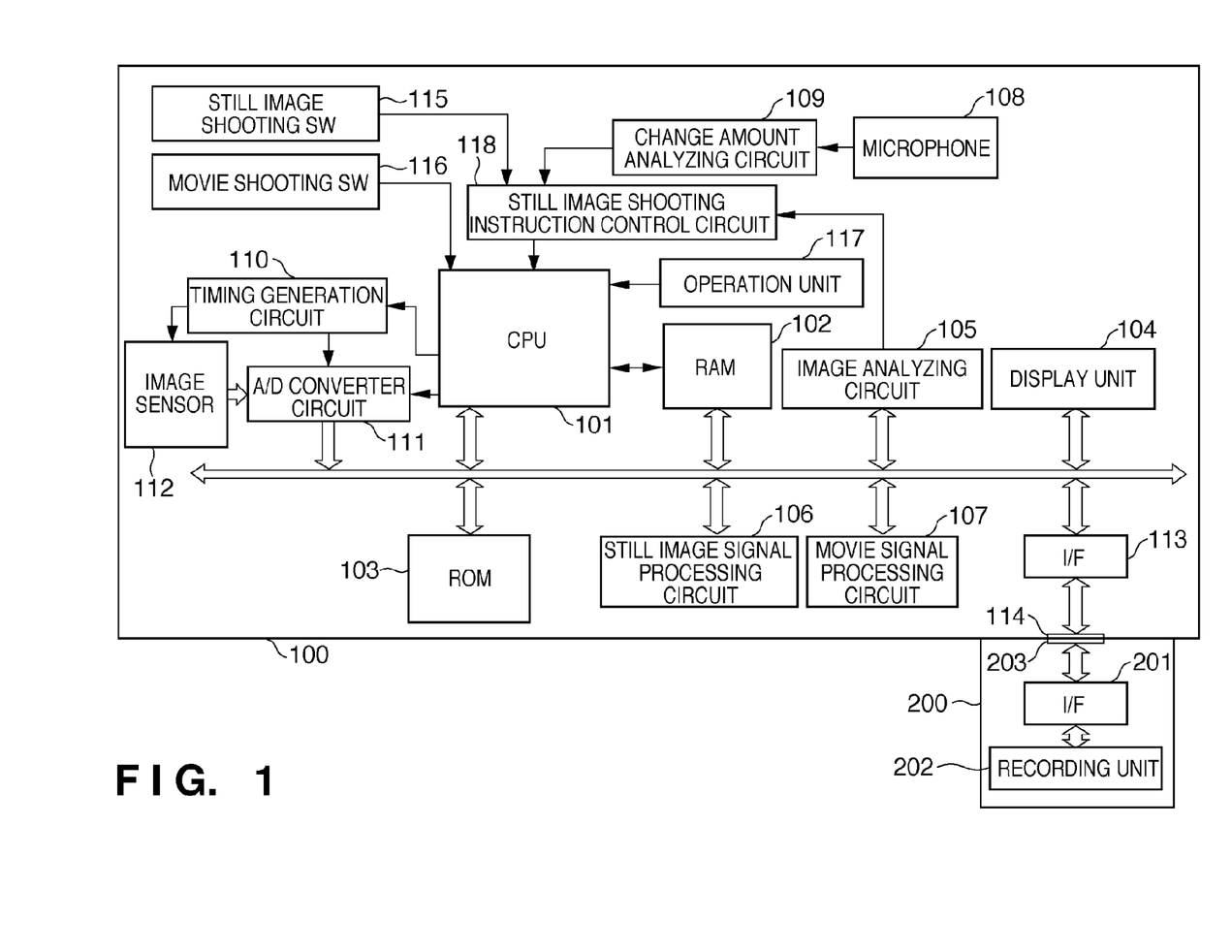
FIG. 1 is a block diagram showing a configuration of a digital camera that realizes an image shooting apparatus of the present invention.

FIG. 1 is a block diagram showing a configuration of a digital camera that realizes an image shooting apparatus of the present invention.

In FIG. 1, reference numeral 101 denotes a CPU that performs overall control of all operations of a digital camera 100, which has a later-described function of recording a still image. Reference numeral 112 denotes an image sensor constituted from a CCD or a CMOS used for obtaining an image signal through photo-electric conversion performed on an object image. Reference numeral 111 denotes an A/D converter circuit that converts an analog image signal output from the image sensor 112 into a digital signal. Reference numeral 110 denotes a timing generation circuit that is controlled by the CPU 101 and supplies a clock signal and a control signal to the image sensor 112 and the A/D converter circuit 111.

Reference numeral 102 denotes a volatile memory (RAM) that is a temporary memory area used as a work area for the CPU 101. The RAM 102 stores movie data and also still image data that are shot and generated by the image sensor 112, and the RAM 102 is provided with a capacity sufficient for storing a predetermined number of still images and a predetermined time-length of a movie. Reference numeral 103 denotes a nonvolatile memory (ROM) that stores a control program of the digital camera 100, and the like.

Reference numeral 106 denotes a still image signal processing circuit. Reference numeral 107 denotes a movie signal processing circuit. Reference numeral 117 denotes an operation unit via which a user performs camera settings etc. Reference numeral 115 denotes a still image shooting switch, and reference numeral 116 denotes a movie shooting switch. Reference numeral 104 denotes a display unit, such as a TFT, for displaying and playing back various types of setting screens of the camera, and a still image and a movie that were shot.

Reference numeral 113 denotes an I/F (interface) with a recording medium such as a memory card or a hard disk, and reference numeral 114 denotes a connector for connecting to a recording medium such as a memory card or a hard disk. Reference numeral 200 denotes a recording medium such as a memory card or a hard disk, reference numeral 201 denotes an interface with the digital camera, and reference numeral 202 denotes a recording unit that records a still image and a movie.

Although the present exemplary embodiment is described as having one interface/connector system for mounting recording media, a single interface/connector system or multiple interface/connector systems for mounting recording media may be provided, and the configuration may include any number of such systems. The configuration may furthermore include combinations of interfaces and connectors of differing standards. Moreover, by providing compatibility with an interface such as a LAN card or a wireless device, a configuration in which still image data and movie data can be transferred to/from another computer or a peripheral device such as a printer is possible.

Reference numeral 105 denotes an image analyzing circuit and analyzes change in a tint, brightness, a motion vector, and the like of data processed by the A/D converter circuit 111 or data stored in the RAM 102. Reference numeral 108 denotes a microphone for capturing audio. Reference numeral 109 denotes a change amount analyzing circuit for analyzing audio data observed by the microphone 108.

Reference numeral 118 denotes a still image shooting instruction control circuit and controls a still image shooting instruction to be output to the CPU 101 based on an analysis result obtained by the still image shooting SW (switch) 115, the change amount analyzing circuit 109, and the image analyzing circuit 105.

Also, the CPU 101 has an interface with the RAM 102 and has a function of storing, in the RAM 102, a signal output from the A/D converter circuit 111, the image analyzing circuit 105, the still image signal processing circuit 106, and the movie signal processing circuit 107. The CPU 101 has a function of accessing the recording medium 200 via the interface 113 and recording still image data and movie data thereto.

Here, the digital camera of the present exemplary embodiment has a function for, with use of the detection of a still image shooting instruction by the CPU 101 as a trigger, selecting and recording still image data that was stored up to the point in time when the still image shooting instruction was detected. Also, as described later, in accordance with the type of information that caused a still image shooting instruction to be issued, the digital camera changes the amount of time tracked back from the point in time when the still image shooting instruction was detected, and selects and automatically records appropriate still image data. Note that information that causes the aforementioned still image shooting instruction to be issued includes, for example, feature information on an object such as a color, brightness, and an absolute value of a motion vector (shift amount of an object); audio information; and operation information.

Figure 2:
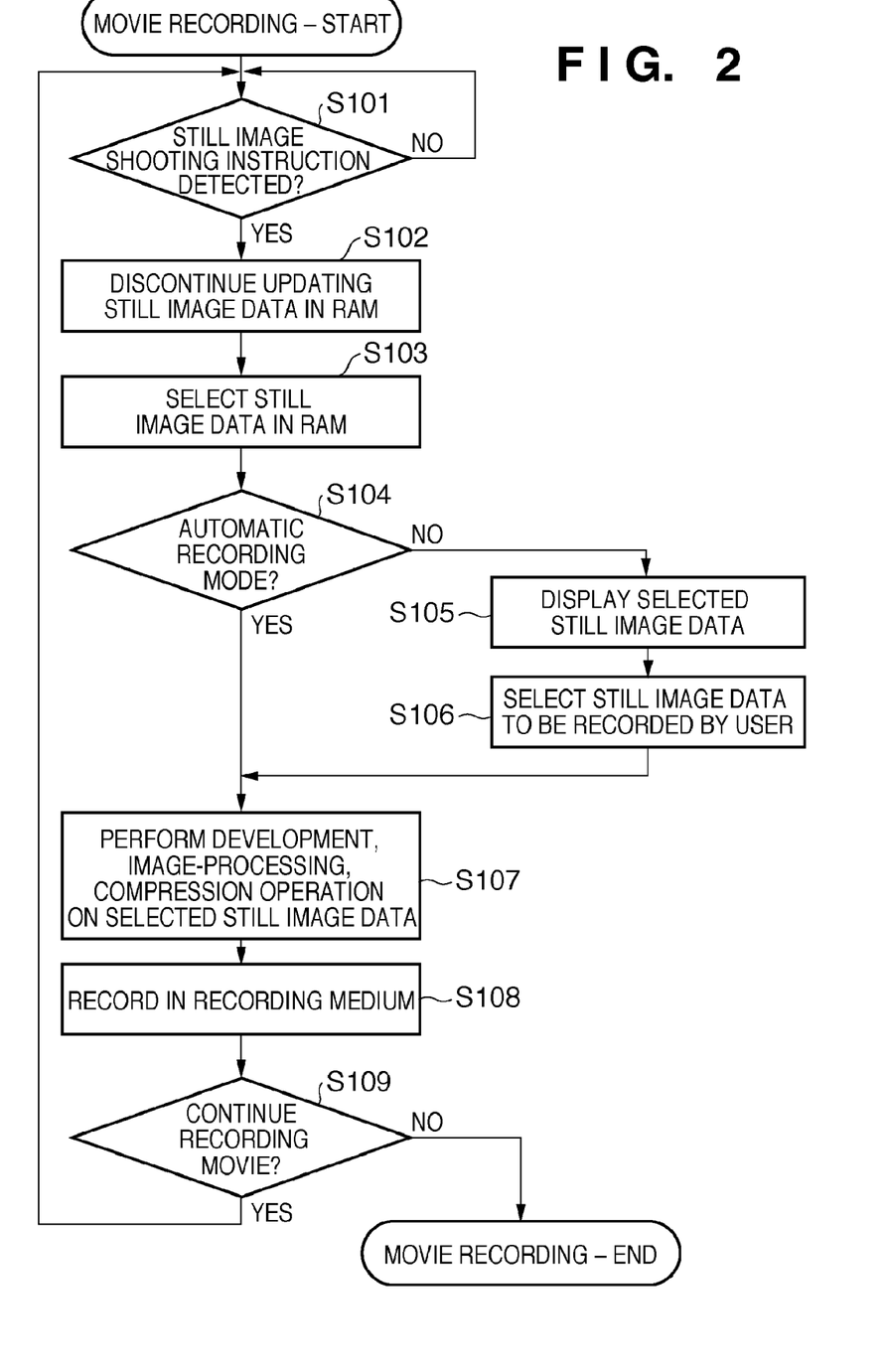
FIG. 2 is a flowchart showing operations performed when a still image shooting instruction is detected in the present exemplary embodiment.

FIG. 2 is a flowchart showing the operations performed when a still image shooting instruction is detected in the present exemplary embodiment.

Figure 3:
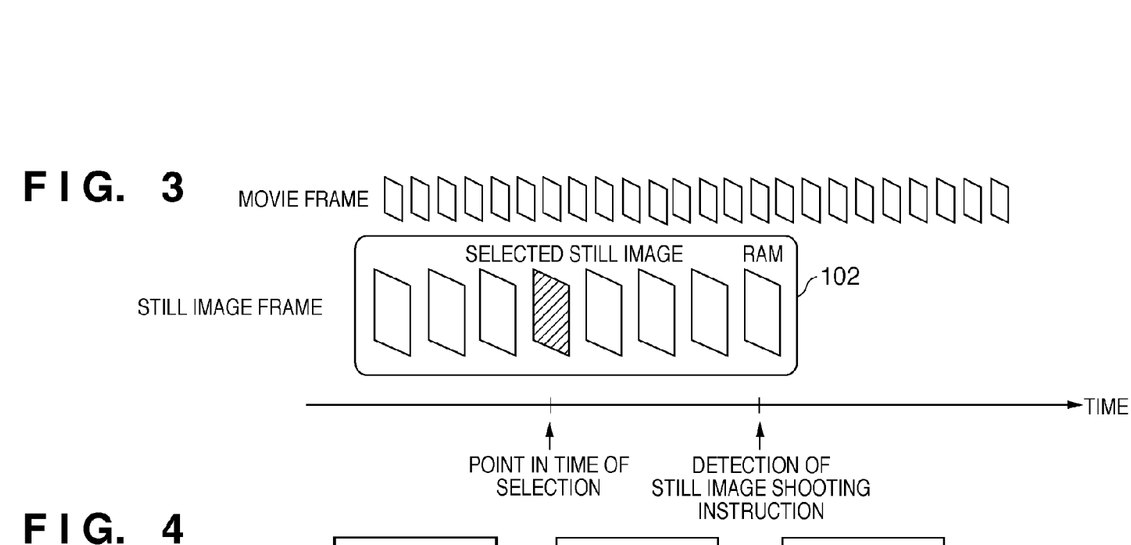
FIG. 3 is a diagram illustrating a method for selecting a still image in the present exemplary embodiment.

First, when the movie shooting switch 116 is pressed, the CPU 101 starts shooting a movie. When movie shooting is started, movie frames are shot at regular time intervals as shown in FIG. 3, and after signal processing is performed by the movie signal processing circuit 107, the frames are sequentially recorded in the recording medium 200 via the interface 113. This operation is continued until the movie shooting switch 116 is pressed again so that the movie shooting is discontinued. Note that although an example of starting movie shooting is described here, for example, a function of displaying an image shot in real time, such as a live view, may be started (the same follows in descriptions below).

In FIG. 2, the CPU 101 waits for detection of a still image shooting instruction in step S101. Based on a predetermined time, the CPU 101 sets a time interval used for storing still images in the RAM 102. Until a still image shooting instruction is detected, still image data larger than a movie in size is obtained at time intervals set in the A/D converter circuit 111 while obtaining a movie. The CPU 101 sequentially and directly stores this still image data in the RAM 102 without performing image processing or the like (FIG. 3). The still image data stored in the RAM 102 is updated in order from old data in an allocated capacity.

If a still image shooting instruction is detected in step S101, updating of the still image data in the RAM 102 is discontinued (S102).

In step S103, the CPU 101 selects a still image among the still image data stored in the RAM 102 by applying the method described below.

Here, the aforementioned method for selecting a still image is described.

The digital camera of the present exemplary embodiment has a function of issuing a plurality of types of still image shooting instructions, and the CPU 101 changes the method for selecting still image data stored in the RAM 102 in accordance with the type of still image shooting instruction and changes still image data to be selected. In addition to the pressing of the still image shooting switch 115, a signal change in sound volume, tint or brightness of an image, motion vector and the like are applicable as a still image shooting instruction. Based on which signal change causes a still image shooting instruction to be performed, a mode is set in accordance with a signal type; however, all signal changes may be conditions applicable as a still image shooting instruction. Further, it is possible to have a configuration in which a priority order is set for the modes, and when all signal changes are applied, it is possible to change the mode that is preferentially applied to cause a still image shooting instruction to be issued. Moreover, an arbitrary combination of modes may be adopted.

As a specific example, the case of applying a change in sound volume as a still image shooting instruction (a sound-volume detection mode or a sound-volume detection priority mode) will be described.

When the sound-volume detection mode is selected, the microphone 108 observes the sound volume, and the audio data is analyzed at all times by the change amount analyzing circuit 109 (detection of a sound volume level). As an analysis result, if the sound volume level exceeds a threshold value set in advance, the change amount analyzing circuit 109 outputs the analysis result to the still image shooting instruction control circuit 118, and the still image shooting instruction control circuit 118 outputs a still image shooting instruction to the CPU 101.

Figure 4:
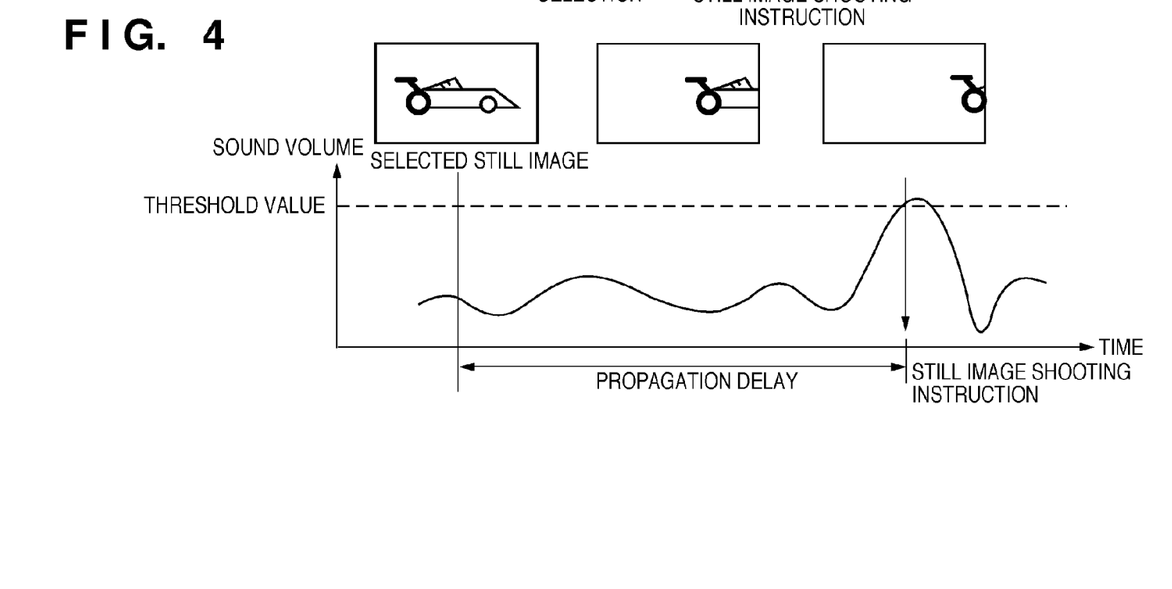
FIG. 4 is a diagram illustrating a method for selecting a still image in a sound-volume detection mode.

FIG. 4 is a diagram illustrating a method for selecting a still image in the sound-volume detection mode and shows an example of a car moving from the left side of the angle of view while shooting a movie. In FIG. 4, the sound volume level rises as the car approaches, and when the sound volume level exceeds the predetermined threshold value, a still image shooting instruction is output. Since the sound propagation speed is slow, at the point in time when sound generated from the car is detected by the microphone 108, and the CPU 101 detects the still image shooting instruction, the car is already far away.

In the present exemplary embodiment, in order to record a still image of the car when it is the closest (in an example in FIG. 4, when the car is in the center of the angle of view), the CPU 101 selects still image data that is stored in the RAM 102 and was shot at a track-back time that is a predetermined amount of time before the detection, not data shot around the point in time when the shooting instruction was detected. When the CPU 101 determines the amount of time to be tracked back from the point in time when the still image shooting instruction is detected, the distance to the object is set in advance, and a time calculated based on the distance value is applied. Note that a method for determining the time to be applied is not limited to this. The amount of time to be tracked back may be set in advance using the operation unit 117, and that time may be applied. Further, the present exemplary embodiment may be configured to include modes according to the shooting environment, such as an indoor mode or a stadium mode, and to determine a time for each mode. With this configuration, an appropriate still image can be selected in accordance with the distance from an object.

Additionally, although one still image corresponding to a track-back time is recorded in the aforementioned example, the present exemplary embodiment may be configured to select a plurality of images before/after an image shot at the determined time.

As described above, since propagation delay of sound is taken into consideration in the sound-volume detection mode, an appropriate still image can be selected even if a still image is selected in the case of applying a change in the sound volume level as a still image shooting instruction.

Next, the case of applying a change in a tint as a still image shooting instruction (a color detection mode or a color detection priority mode) will be described.

When the color detection mode is selected, while shooting a movie, the tint of a movie is analyzed by the image analyzing circuit 105, and color detection is performed. If a color detection value in a predetermined color detection area of the movie exceeds a threshold value set in advance, the image analyzing circuit 105 outputs the comparison result to the still image shooting instruction control circuit 118, and the still image shooting instruction control circuit 118 outputs a still image shooting instruction to the CPU 101.

Figures 5, 6:
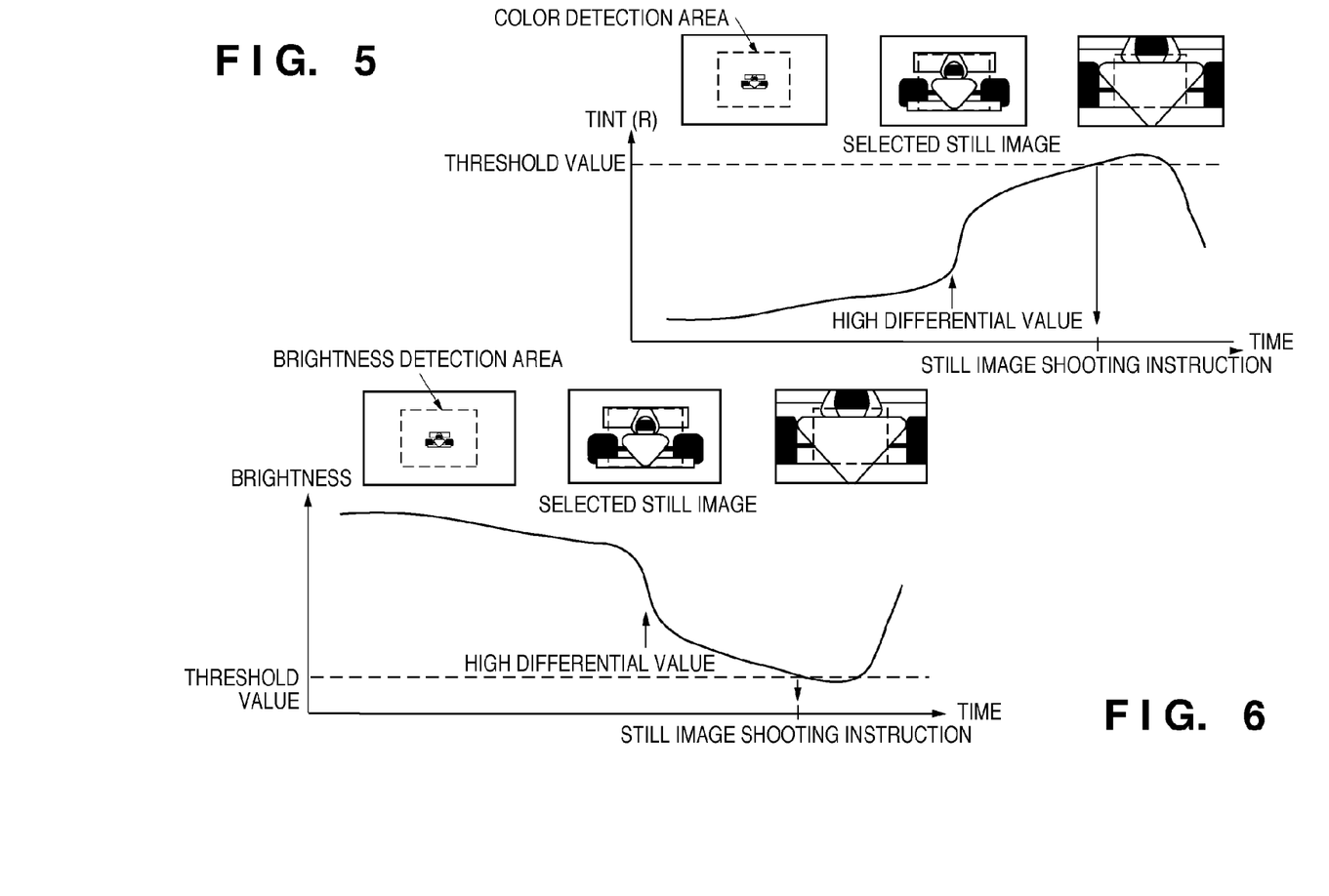
FIG. 5 is a diagram illustrating a method for selecting a still image in a color detection mode.
FIG. 6 is a diagram illustrating a method for selecting a still image in a brightness detection mode.

FIG. 5 is a diagram illustrating a method for selecting a still image in the color detection mode and shows an example of a car (red) moving from the back side of the angle of view while shooting a movie. When the car is positioned in the color detection area that is the center of the angle of view, if a color detection value in the color detection area exceeds the predetermined threshold value, a still image shooting instruction is output. Until this point, the image analyzing circuit 105 monitors the color detection value.

When the still image shooting instruction is detected, the CPU 101 calculates the point in time when the amount of change in a color detection value is high (the point in time when a differential value of the color detection value is high) so as to determine the amount of time to be tracked back from the point in time when the still image shooting instruction was detected. Thereafter, the CPU 101 selects still image data that is stored in the RAM 102 and was shot at the track-back time that is the predetermined amount of time before the detection. Note that the method for determining the aforementioned amount of time to be tracked back is not limited to this, and the point in time when a change in a color detection value starts may be applied. Also, a point in time between when a change in a color detection value started and when a still image shooting instruction was detected may be applied. Additionally, a track-back time (amount of time to be tracked back) may be set in advance using the operation unit 117, and that time may be applied.

Moreover, although one still image corresponding to a track-back time is recorded in the aforementioned example, the present exemplary embodiment may be configured to select a plurality of images before/after an image shot at the determined time.

As described above, when in the color detection mode, it is possible to detect a color that was set in the predetermined color detection area, capture an object and select still image data in which the object is in an appropriate position in the angle of view.

Next, the case of applying a change in brightness as a still image shooting instruction (a brightness detection mode or a brightness detection priority mode) will be described.

When the brightness detection mode is selected, while shooting a movie, the brightness of the movie is analyzed by the image analyzing circuit 105, and brightness detection is performed. If a brightness detection value in a predetermined brightness detection area exceeds a threshold value set in advance, the image analyzing circuit 105 outputs the comparison result to the still image shooting instruction control circuit 118, and the still image shooting instruction control circuit 118 outputs a still image shooting instruction to the CPU 101.

FIG. 6 is a diagram illustrating a method for selecting a still image in the brightness detection mode and shows an example of a car moving from the back side of the angle of view while shooting a movie. When the car comes in the predetermined brightness detection area that is in the central range of the angle of view, if a brightness detection value in the brightness detection area exceeds a predetermined threshold value, a still image shooting instruction is output. Until this point, the image analyzing circuit 105 monitors the brightness detection value.

The CPU 101 calculates the point in time when the amount of change in the brightness detection value is high (the point in time when a differential value of the brightness detection value is high) so as to determine the amount of time to be tracked back from the point in time when the still image shooting instruction was detected. Thereafter, the CPU 101 selects still image data that is stored in the RAM 102 and was shot at the track-back time that is the predetermined amount of time before the detection.

The method for determining the aforementioned amount of time to be tracked back is not limited to this, and the point in time when a change in the brightness detection value starts may be applied. Also, a point in time between when a change in a brightness detection value started and when a still image shooting instruction was detected may be applied. Additionally, a track-back time (amount of time to be tracked back) may be set in advance using the operation unit 117, and that time may be applied.

Moreover, although one still image corresponding to a track-back time is recorded in the aforementioned example, the present exemplary embodiment may be configured to select a plurality of images before/after an image shot at the determined time.

As described above, in the brightness detection mode, it is possible to detect brightness that was set in the predetermined brightness detection area, capture an object, and select still image data in which the object is in an appropriate position of the angle of view.

Next, the case of applying a change in a motion vector as a still image shooting instruction (a motion vector detection mode or a motion vector detection priority mode) will be described.

When the motion vector detection mode is selected, while shooting a movie, a motion vector of the movie is analyzed by the image analyzing circuit 105, and motion vector detection is performed. If a motion vector (absolute value) in a predetermined motion vector detection area exceeds a threshold value set in advance, the image analyzing circuit 105 outputs the comparison result to the still image shooting instruction control circuit 118, and the still image shooting instruction control circuit 118 outputs a still image shooting instruction to the CPU 101.

Figure 7:
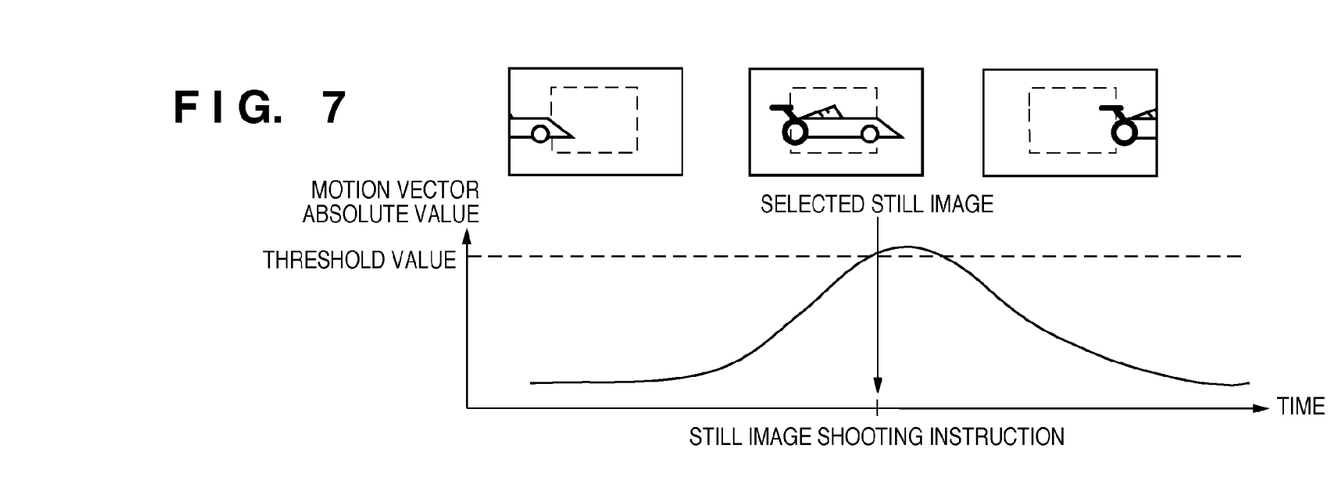
FIG. 7 is a diagram illustrating a method for selecting a still image in a motion vector detection mode.

FIG. 7 is a diagram showing a method for selecting a still image in the motion vector detection mode and shows an example of a car moving from the left side of the angle of view while shooting a movie. When the car comes in the predetermined motion vector detection area that is in a central range of the angle of view, if a motion vector in the motion vector detection area exceeds the predetermined threshold value, a still image shooting instruction is output. The CPU 101 calculates a speed of an object from the motion vector value at the point in time when the still image shooting instruction was detected, and based on system time-lag of the digital camera 100 from the point in time when a motion vector is detected until the point in time when the still image shooting instruction is issued, the CPU 101 determines the amount of time to be tracked back from the point in time when the still image shooting instruction was detected. Thereafter, the CPU 101 selects still image data that is stored in the RAM 102 and was shot at the track-back time that is the predetermined amount of time before the detection. Note that the method for determining the aforementioned amount of time to be tracked back is not limited to this, and a track-back time (amount of time to be tracked back) may be set in advance using the operation unit 117, and that time may be applied.

Although one still image corresponding to a track-back time is recorded in the aforementioned example, the present exemplary embodiment may be configured to select a plurality of images before/after an image shot at the determined time.

As described above, in the motion vector detection mode, it is possible to detect a motion vector that was set in the predetermined motion vector detection area, capture an object, and select a still image in which the object is in an appropriate position of the angle of view.

Finally, the case of applying the pressing of the still image shooting switch 115 as a still image shooting instruction (a release mode or a release priority mode) will be described.

In the release mode, if the still image shooting switch 115 is pressed, the result is output to the still image shooting instruction control circuit 118, and the still image shooting instruction control circuit 118 outputs a still image shooting instruction to the CPU 101.

Figure 8:
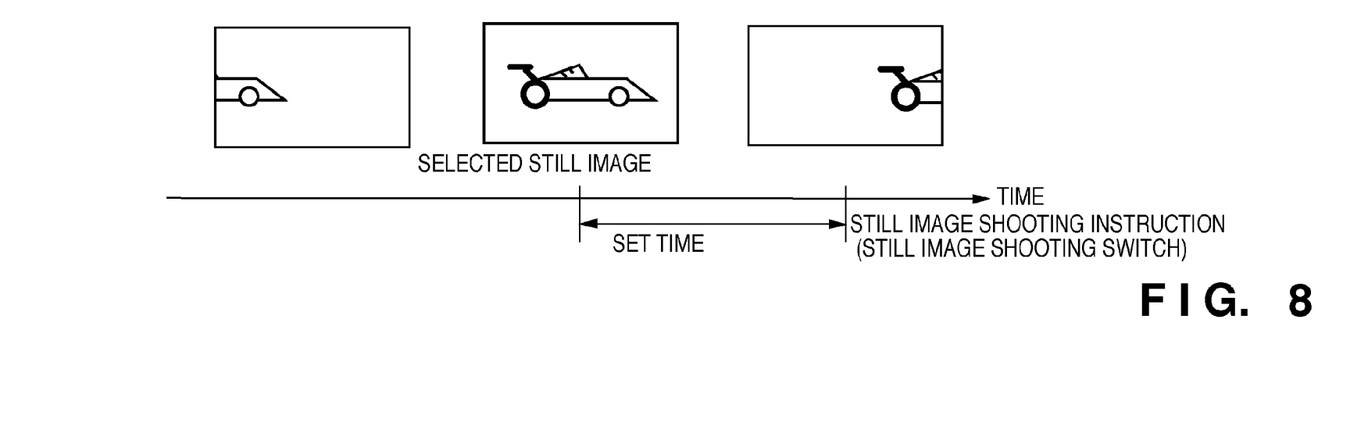
FIG. 8 is a diagram illustrating a method for selecting a still image in a release mode.

FIG. 8 is a diagram illustrating a method for selecting a still image in the release mode and shows an example of a car moving from the left side of the angle of view while shooting a movie. When the car is positioned in the vicinity of the center of the angle of view, if the still image shooting switch 115 is pressed, a still image shooting instruction is output. When the CPU 101 detects the still image shooting instruction, the CPU 101 selects still image data that is in the RAM 102 and was shot at the track-back time that is the predetermined amount of time set using the operation unit 117 before the detection.

Note that, although one still image corresponding to a track-back time is recorded in the aforementioned example, the present exemplary embodiment may be configured to select a plurality of images before/after an image shot at the determined time. Also, still image data may be selected at regular time intervals between the determined time and the point in time when a still image shooting instruction is detected.

In step S103, still image data is selected in each mode by following the procedures described above.

Next, if an automatic recording mode (still image data to be recorded by the CPU 101 is determined) is selected in step S104, processing proceeds to step S107.

In step S107, the still image the signal processing circuit 106 performs predetermined image processing on the still image data selected in step S103 by.

Then, in step S108, the data is recorded in the recording medium 200 via the interface 113.

In step S109, if continuation of movie shooting is selected, processing returns to step S101 again, and the CPU 101 waits for detection of a still image shooting instruction.

By performing the above operations, the digital camera 100 of the present exemplary embodiment can select and record still image data in which an object is in an appropriate position among still image data shot before the point in time when the CPU 101 detected a still image shooting instruction. Furthermore, in the present exemplary embodiment, modes for each type of a still image shooting instruction are provided, and a method for determining the amount of time to be tracked back from the point in time when a still image shooting instruction was detected is changed in accordance with each mode, and accordingly, still image data in which an object is in an appropriate position can be selected and recorded regardless of the still image shooting instruction type.

Note that, if the automatic recording mode is not selected in step S104 (a user selection mode), processing proceeds to step S105, and still image data selected in step S103 is displayed on the display unit 104. Using the data shot at that point in time as a reference point, a user changes the still image data displayed on the display unit 104 with a selection dial or the like, and selects a desired still image among still images in the RAM 102 (S106).

After that, processing proceeds to step S107, and the aforementioned operations are performed.

Conventionally, in the case of displaying still image data in the RAM 102 in chronological (or reverse chronological) order for a user to select data, it has been necessary to display a great number of still images until desired still image data is displayed on the display unit 104.

In contrast, the CPU 101 selects still image data once in step S103 described above, thereby enabling the user to easily select and record desired still image data among still image data obtained before the point in time when a still image shooting instruction was detected.

Note that the scope of the present invention includes all variations in which a method for selecting still image data stored in a memory area such as a RAM is determined based on the type of still image shooting instruction in accordance with a program.

Second Exemplary Embodiment

In the aforementioned first exemplary embodiment, since still image data is stored in the RAM 102 at regular time intervals, the greatest value of time that can be tracked back from the point in time when a still image shooting instruction was detected is also constant. However, since the amount of time to be tracked back changes in accordance with each mode (a sound-volume detection mode, a color detection mode, etc.), it is necessary to set the greatest value of time that can be tracked back for each mode.

In view of this, in the present exemplary embodiment, a method for storing still image data in the RAM 102 is changed for each mode, and appropriate still image data can be selected in accordance with the modes.

Figure 9:
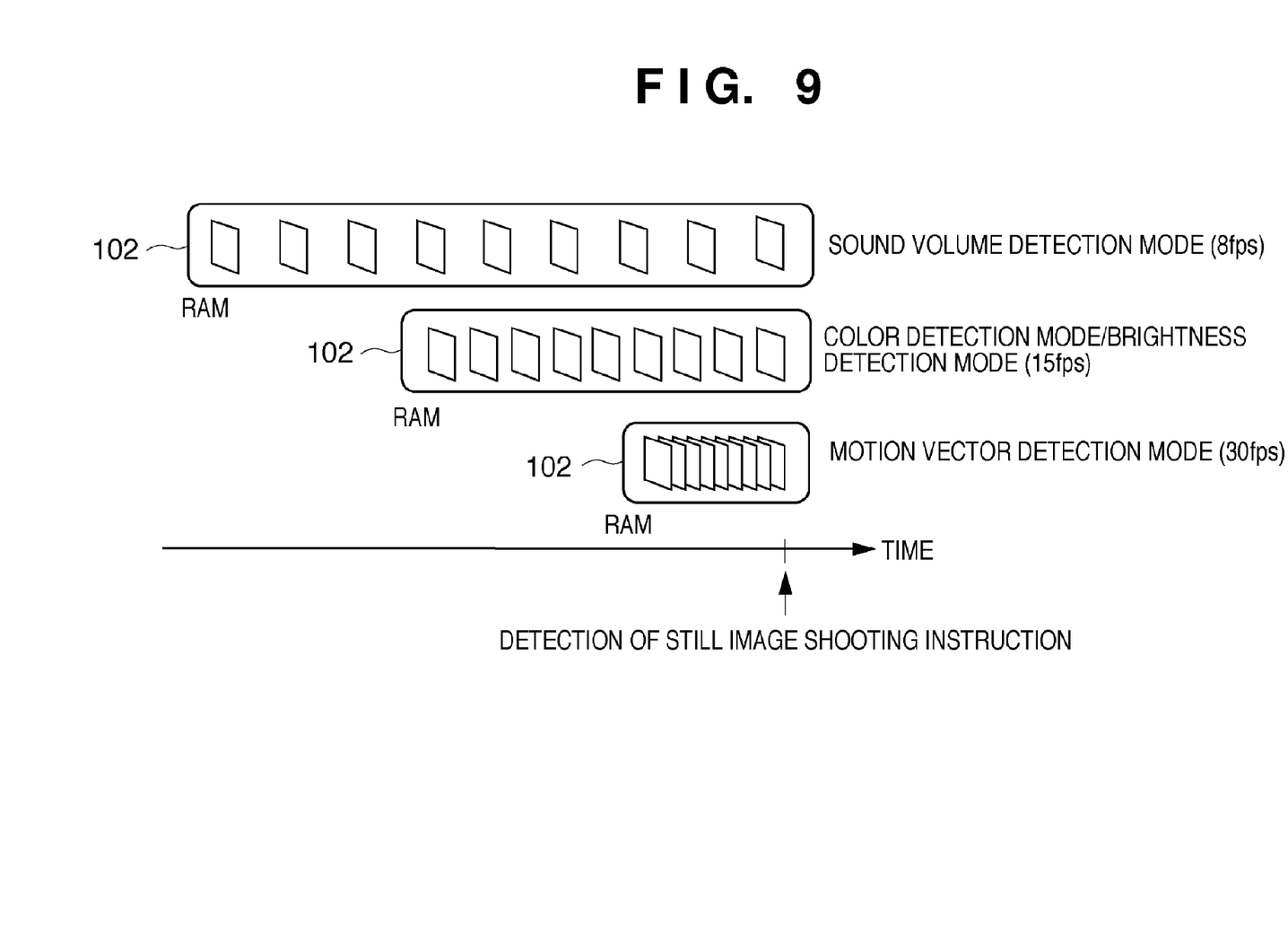
FIG. 9 is a diagram illustrating a method for storing a still image in a second exemplary embodiment according to the present invention.

FIG. 9 shows an example of a method for storing still image data in the RAM 102 for each mode. In this example, the CPU 101 sets a rate of storing still image data in advance for each mode, and the rate is applied in accordance with each mode. For example, still image data is stored in the RAM 102 at 8 fps in the sound-volume detection mode, at 15 fps in the color detection mode and the brightness detection mode, and at 30 fps in the motion vector detection mode. Further, data is updated by being overwritten in order from old still image data. Since the capacity of the RAM 102 is constant, the amount of still image data to be stored is the same in each mode. As shown in FIG. 9, under these conditions, if the storage rate is low, still image data that remains in the RAM 102 is from the more distant past.

Note that in stead of changing the time intervals used for shooting still images in accordance with the aforementioned modes, for example, the amount of time that past images are stored in the RAM may be changed, without changing the storage rate. For example, images obtained in the past may be stored in the RAM for, for example, five seconds in the sound-volume detection mode, three seconds in the color detection mode and the brightness detection mode, or one second in the motion vector detection mode.

When in the sound-volume detection mode, it is necessary to save still image data obtained in the more distant past since the sound propagation speed is slow, and therefore the CPU 101 sets a low storage rate. Note that as described in the first exemplary embodiment, in the case of determining the amount of time to be tracked back in accordance with the distance to an object, or the like, the present exemplary embodiment may be configured to calculate an update rate that can sufficiently accommodate the amount of time to be tracked back and apply the rate. Also, the present exemplary embodiment may be configured to set the maximum amount of time that can be tracked back, automatically determine the update rate by performing a calculation including the capacity of the RAM 102 based on the maximum amount of time, and apply the rate.

When in the color detection mode and in the brightness detection mode, the amount of time to be tracked back changes in accordance with the speed of an object and the like, and therefore the speed of the object is set, the CPU 101 calculates a storage rate that can sufficiently accommodate the amount of time to be tracked back based on the speed and applies the rate. Also, the storage rate may be set in advance. Moreover, the speed of an object may be calculated in advance from the motion vector detection result, and a storage rate that reflects the obtained value may be applied. In addition, the maximum amount of time that can be tracked back may also be set, and based on that time, a storage rate may be automatically determined by performing a calculation including the capacity of the RAM 102, and the rate may be applied.

When in the motion vector detection mode, a storage rate set in advance is applied. Also, the maximum amount of time that can be tracked back may be set, and based on that time, a storage rate is automatically determined by performing a calculation including the capacity of the RAM 102, and the rate may be applied.

When in the release mode, a storage rate set in advance is applied. Also, the maximum amount of time that can be tracked back may be set, and based on that time, a storage rate is automatically determined by performing a calculation including the capacity of the RAM 102, and the rate may be applied.

With the aforementioned configuration, the CPU 101 selects appropriate still image data among still image data stored in the RAM 102. The selection and subsequent operations are performed as described in the first exemplary embodiment, and therefore description of such processes will be omitted here.

As described above, by changing the rate of storing still image data according to each mode, it is possible to change the greatest value of time that can be tracked back from the point in time when a still image shooting instruction was detected. Thus, appropriate still image data can be selected and recorded.

Third Exemplary Embodiment

Although the configuration in the second exemplary embodiment is adapted to the case where each mode is applied separately, the configuration is not suitable for the case where a plurality of still image shooting instructions are issued by combining arbitrary modes and the like. For example, if the storage rate for the sound-volume detection mode is applied, the storage rate is low when detecting a still image shooting instruction based on a motion vector, and therefore there may be an inconvenience such as lack of a sufficient amount of still image data for a selection.

In view of this, a method for storing still image data when arbitrary modes are combined will be described in the present exemplary embodiment.

Figure 10:
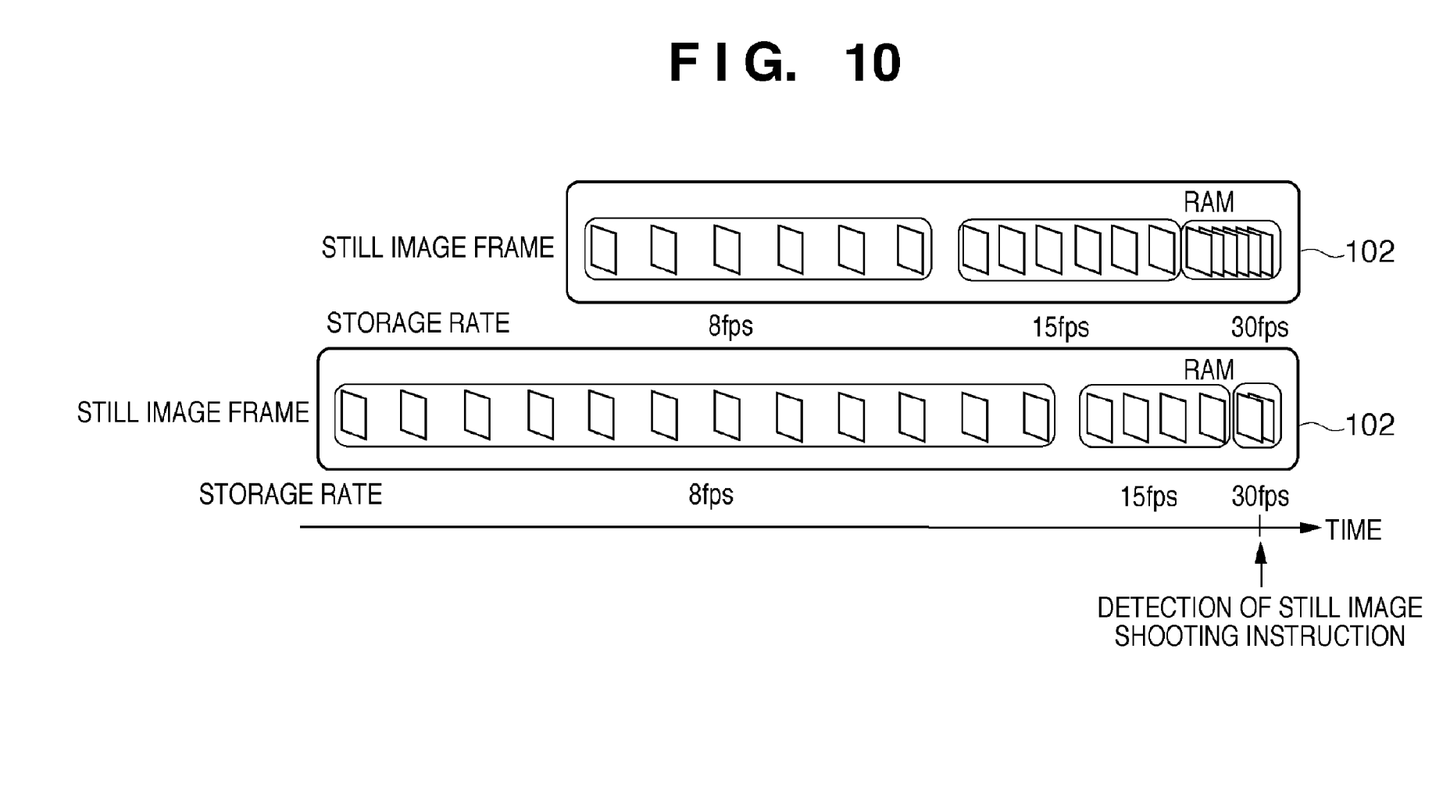
FIG. 10 is a diagram illustrating a method for storing a still image in a third exemplary embodiment according to the present invention.

FIG. 10 shows an example of a method for storing still image data in the RAM 102 when arbitrary modes are combined. The CPU 101 increases the storage rate (30 fps) around the point in time when a still image shooting instruction was detected. After a predetermined time elapses, still image data stored in the RAM 102 is thinned to a predetermined first interval (15 fps). After more time elapses, the still image data thinned to 15 fps is further thinned to a predetermined second interval (8 fps). This configuration enables accommodating still image selection for each mode. For example, if a still image shooting instruction is detected in the sound-volume detection mode, still image data thinned to 8 fps is selected. If a still image shooting instruction is detected in the motion vector detection mode, still image data stored at 30 fps is selected. Consequently, the RAM 102 is divided into areas where still image data is stored and updated at 8 fps, 15 fps, and 30 fps by the CPU 101.

Here, if the size of an area in which data is stored at a low rate (8 fps) is increased (the amount of still image data that can be stored is increased), still image data remaining in the RAM 102 is older (the amount of time that can be tracked back becomes longer). Thus, when combining arbitrary modes, depending on which mode is given priority, the CPU 101 changes the sizes of the areas for each storage rate so as to accommodate still image selection in each mode.

Hereinafter, a method for storing still image data in the RAM 102 in the case of setting a priority order for each mode will be described with reference to FIG. 11.

Figure 11:
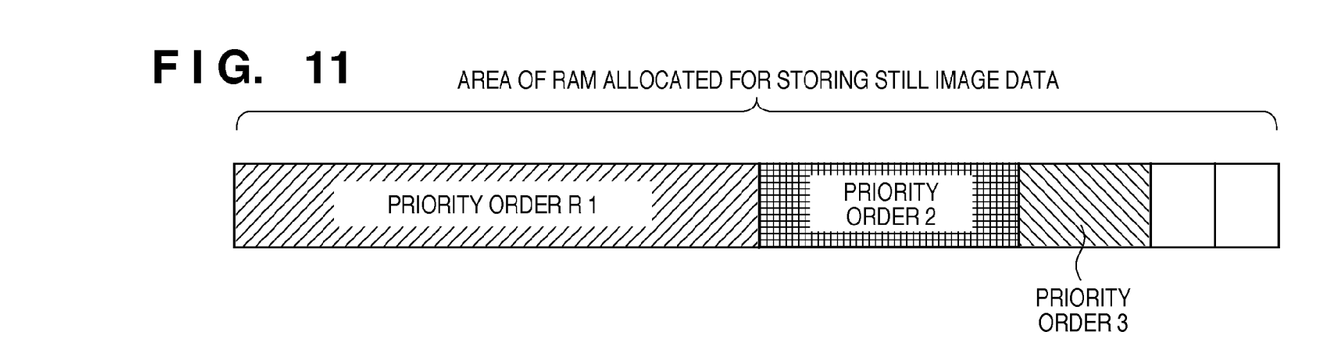
FIG. 11 is a diagram illustrating a method for dividing an area in the third exemplary embodiment according to the present invention.

In FIG. 11, first, a storage rate is set for each mode. In the present exemplary embodiment, the method for setting a storage rate for each mode described in the second exemplary embodiment is applied. Then, the CPU 101 retains half of the entire area in the RAM 102 allocated for storing a still image as an area size conforming to the storage rate of the mode that is the highest in the priority order. Next, the CPU 101 retains half of the remaining area as an area size conforming to the storage rate of the mode that is second in the priority order. In this way, half of the remaining area is sequentially allocated in order from the highest in the priority order. Consequently, the area used for a mode that is higher in the priority order is larger, and in the case of the storage rate of the mode which is higher in the priority order, more still image data can be saved. For example, if the sound-volume detection mode is the highest in the priority order, an area used for a low storage rate is large, and therefore still image data that remains in the RAM 102 is older.

Figure 12:
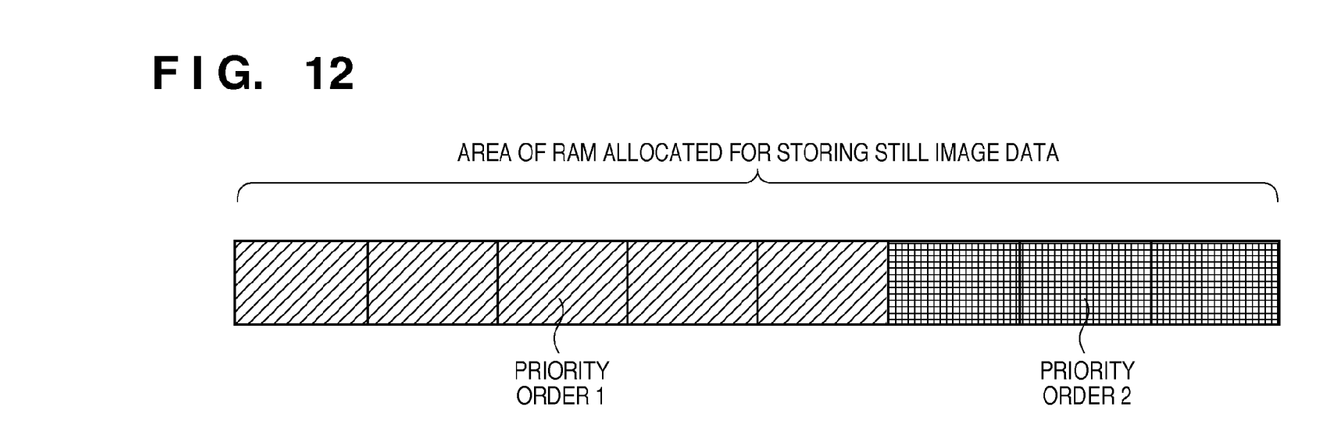
FIG. 12 is a diagram illustrating another method for dividing an area in the third exemplary embodiment according to the present invention.

In the present exemplary embodiment, half of the remaining area is sequentially allocated as an area used for the storage rate of the mode that is higher in the priority order. However, the method for allocating an area is not limited to this. The proportion of the remaining area that is to be allocated may be arbitrarily set. Also, the remaining area may be equally allocated or the like for modes that are not selected when combining modes. Moreover, as illustrated in FIG. 12, the RAM 102 may be divided into a plurality of areas, and the number of divided areas may be set according to the priority order for the modes or the storage rate of the modes. Moreover, the scope of the present invention includes all variations in which the memory area of a RAM and the like is divided according to a priority order for modes, and storage rates are calculated and respectively applied to the divided areas in accordance with a program.

Accordingly, still image data is selected among still image data stored in the RAM 102 and recorded. The selection of still image data and subsequent operations are performed as described in the first exemplary embodiment, and therefore a description of such processes will be omitted here.

As described above, the RAM 102 is divided into areas for each storage rate, and the size of each divided area is changed according to the priorities of the modes, and therefore in the case of the mode that is higher in the priority order, more still image data can be stored in the RAM 102. Further, by also retaining areas used for the storage rates of other modes, it is possible to accommodate still image selection if a still image shooting instruction is detected in other modes.

Other Exemplary Embodiment

The subject matter of the present invention can also be implemented by supplying, to a system or apparatus, a storage medium having recorded therein the program code of software that realizes the functions of the aforementioned embodiments. That is, it goes without saying that the subject matter the present invention can also be implemented by causing a computer (CPU or MPU) in the system or apparatus to read out and execute the program code stored in the storage medium.

In such a case, the program code itself read out from the storage medium realizes the functions of the aforementioned embodiments, and the storage medium in which the program code is stored composes the present invention.

Examples of a storage medium for supplying the program code include a flexible disk, a hard disk, an optical disk, a magneto-optical disk, a CD-ROM, a CD-R, magnetic tape, a non-volatile memory card, a ROM, and so on. Moreover, there is also a case of realizing the functions of the aforementioned embodiments by a computer executing the read-out program code.

Moreover, it goes without saying that the scope of the present invention also includes the case where an OS (operating system) or the like running in a computer performs part or all of the actual processing based on instructions in the program code, and the functions of the aforementioned embodiments are realized by that processing.

Furthermore, the program code read out from the storage medium may be written into a memory provided in a function expansion board inserted into the computer or a function expansion unit connected to the computer. Then, a CPU or the like included in the function expansion board or function expansion unit may perform all or part of the actual processing based on instructions included in the program code, and the functions of the aforementioned embodiments may be implemented through that processing. It goes without saying that this also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-120765, filed May 2, 2008, which is hereby incorporated by reference herein in its entirety.

What is claimed is:

1. An image shooting apparatus, comprising:
an image sensing unit configured to generate image data by performing photo-electric conversion on an object image;
an output unit configured to output a trigger for recording image data in a recording medium;
a storage unit configured to continuously store a plurality of image data generated by the image-sensing unit in a temporary memory area at predetermined time intervals from before said output unit outputs the trigger;
a selection unit configured to select image data that was shot at a track-back time that is a predetermined amount of time before the trigger output among the image data stored in the temporary memory area in response to said output unit outputting the trigger; and
a recording unit configured to record image data selected by said selection unit in the recording medium,
wherein said storage unit stores the plurality of image data at a first frame rate until the track-back time is a first amount of time before the trigger output and stores the plurality of image data at a second frame rate which is lower than the first frame rate until the track-back time is a second amount of time past the first amount of time,
wherein there exists a plurality of factors that causes said output unit to output the trigger,
said selection unit selects image data stored in the temporary memory area, of which the track back time before the trigger output and frame rate are different, on the basis of a type of the factor that causes said output unit to output the trigger.

2. The apparatus according to claim 1, wherein the factor includes an analysis result of a feature of an object in the image data.

3. The apparatus according to claim 2, wherein the feature of the object includes at least one of a tint of the object, a brightness of the object, and a shift amount of the object, and the output unit outputs the trigger in response to when the analysis result is satisfied with a predetermined condition.

4. The apparatus according to claim 1, wherein the factor includes an analysis result of audio data stored concurrently with the image data.

5. The apparatus according to claim 1, wherein the factor includes a manual operation by a user.

6. A control method of an image shooting apparatus which has an image sensing unit configured to generate image data by performing photo-electric conversion on an object image, an output unit configured to output a trigger for recording image data in a recording medium, and a storage unit configured to continuously store a plurality of image data generated by the image-sensing unit in a temporary memory area at predetermined time intervals from before said output unit outputs the trigger, the method comprising:
a selecting step of selecting image data that was shot at a track-back time that is a predetermined amount of time before the trigger output among the image data stored in the temporary memory area in response to said output unit outputting the trigger; and
a recording step of recording image data selected by said selection unit in the recording medium,
wherein said storage unit stores the plurality of image data at a first frame rate until the track-back time is a first amount of time before the trigger output and stores the plurality of image data at a second frame rate which is lower than the first frame rate until the track-back time is a second amount of time past the first amount of time,
wherein there exists a plurality of factors that causes said output unit output the trigger,
in said selecting step image data stored in the temporary memory area, of which the track back time before the trigger output and frame rate are different, is selected on the basis of a type of the factor that causes said output unit to output the trigger.

* * * * *